July 19, 1932.   W. L. HARRIS   1,867,698
METHOD OF AND APPARATUS FOR TESTING INTERNAL COMBUSTION ENGINES
Filed June 9, 1928

Inventor:
William L. Harris
By Frank L. Belknap
Atty.

Patented July 19, 1932

1,867,698

UNITED STATES PATENT OFFICE

WILLIAM L. HARRIS, OF CHICAGO, ILLINOIS, ASSIGNOR TO MOTOSCOPE CORPORATION OF AMERICA, OF CHICAGO, ILLINOIS, A CORPORATION OF ILLINOIS

METHOD OF AND APPARATUS FOR TESTING INTERNAL COMBUSTION ENGINES

Application filed June 9, 1928. Serial No. 284,055.

The present invention relates to a method of, and apparatus for, testing internal combustion engines, and refers more particularly to a method and apparatus especially adapted for ascertaining the condition of the carburetor, valves, pistons, piston rings, cylinder walls and parts of this general nature in such engines.

Heretofore, it has been proposed to test the condition of the valves, pistons and parts of an internal combustion engine of this general nature by removing the spark plugs from the cylinders and substituting a pressure or compression gauge therefor, the engine being then slowly cranked by hand and the amount of compression noted. In the event the compression is below normal, the operator will know that the valves or pistons do not fit properly, but he will not be able to tell which of the two is defective, hence such tests tend to serve as a check upon the compression condition of the engine and do not materially aid in locating the cause of the trouble.

It is an object, therefore, of the present invention to provide a method of, and apparatus for, testing internal combustion engines having certain features of novelty and utility over those known to the prior art.

It is another object of the present invention to provide a method of, and apparatus for, testing the condition of the valves and pistons of an internal combustion engine by determining the vacuum condition in the intake manifold thereof while the motor is in operation.

The method of the present invention preferably comprises connecting, by means of a conduit having a restricted opening, a vacuum gauge or similar vacuum registering means.

As a feature of the present invention the operator will be able to determine whether compression loss is due to valve or piston trouble.

As another feature of the present invention, the adjustment upon the carburetor may be checked by the method and apparatus of the present invention.

The invention is adapted for testing, with equal facility, internal combustion engines of the four cylinder type, as well as those of the six and eight cylinder type.

Other objects, features and advantages of the present invention will be more apparent from the following detailed description.

In the drawing, Fig. 1 is an elevational view showing part of an automobile engine with the testing device for carrying out the present invention attached to the intake manifold thereof.

Figure 1:
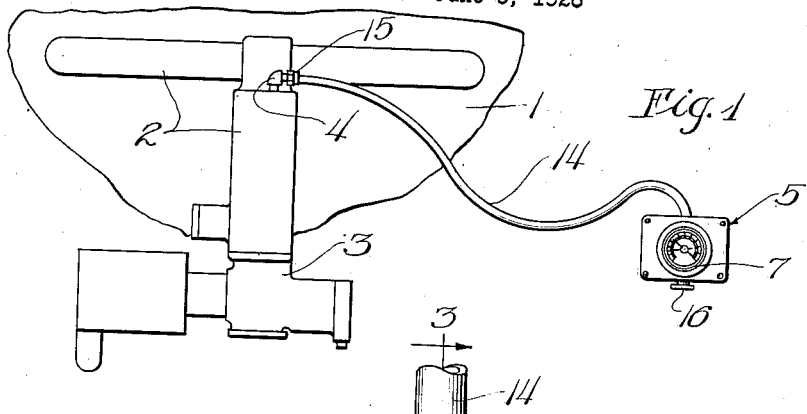
Figure 2:
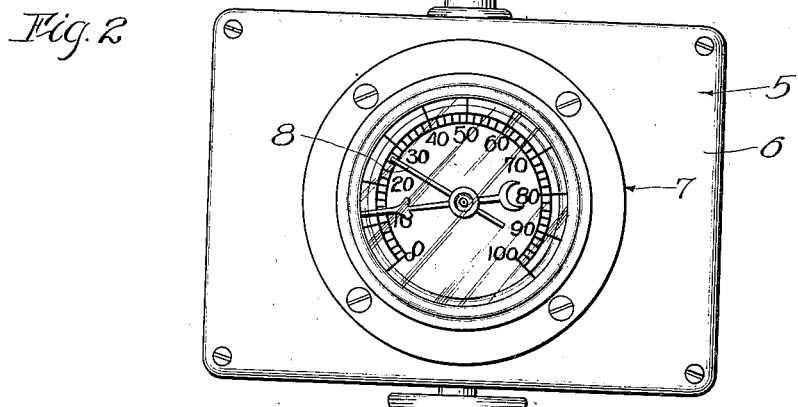
Fig. 2 is a plan view of the testing device of the present invention.
Figure 3:
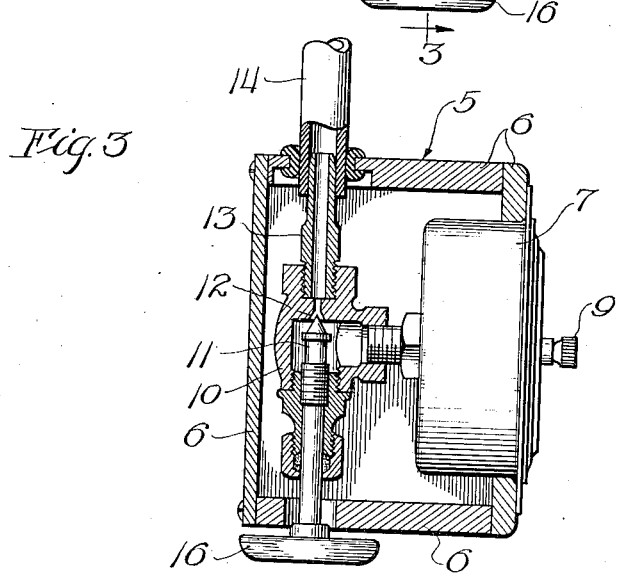
Fig. 3 is a vertical cross sectional view taken on line 3—3 of Fig. 2.

Referring more in detail to the drawing, 1 designates a portion of an automobile engine of the internal combustion type, having an intake manifold 2 and a carburetor 3. It is the general practice to provide intake manifolds with a fitting 4 adapted to receive a conduit (not shown) communicating with the vacuum fuel feed tank which is now more or less standard equipment upon automobiles.

The device adapted to carry out the present invention is designated as a whole at 5 and may preferably comprise a case portion 6 made of any suitable material, such as wood, fibre, or the like, adapted to receive a vacuum gauge 7 of a conventional type readily obtainable upon the market. The face of the gauge 7 may be calibrated with any suitable set of numbers and may also be provided with a maximum reading indicating hand 8 adapted to be returned to zero position by means of the thumb-knob 9.

The gauge 7 may be connected to a valve 10 provided with a needle stem 11 adapted to seat in a seat 12. The valve 10 may carry a nipple 13 adapted to receive a flexible conduit 14 which may comprise a rubber tube or the like. This conduit 14 may have attached to its other end a coupling 15 adapted to engage the fitting 4. The stem 11 of the valve 10 may protrude outside of the case 6 whereby the handle 16 thereon may be readily rotated for adjustment of the valve by the user of the device.

In the operation and utilization of the device, the coupling 15 may be connected to the fitting 4 and the engine put into operation. As is well known to those skilled in the art there will be an amount of fuel in the vacuum feed tank sufficient to operate the motor for the time required to make the tests.

To test the adjustment of the carburetor at low speed range the engine may be run at low throttle and the hand upon the gauge 7 observed. If the hand has a "floating" movement, i. e. not tending to remain in any definite point, the adjustment of the carburetor is too rich or too lean. By adjusting the carburetor until the hand upon the gauge remains substantially in one position, the mixture of air and gasoline delivered to the engine will be substantially perfect. In case the valve 10 is opened too far the hand on the gauge will show a quick, constant, trembling movement. This movement is caused by the variation in the vacuum on the intake manifold as each cylinder begins its intake stroke. Such movement is especially noticeable with engines having six cylinders or less. By closing the valve just to the point where this movement stops the reading of the gauge during tests will be facilitated.

The variation between four, six and eight or more cylinders may be controlled by means of the valve 10.

To test the condition of the valves and pistons the engine is operated at low throttle and the valve 10 is closed to the point where the above described trembling movement ceases. Assuming that the carburetor has been adjusted properly, the hand should now remain substantially stationary if the pistons and valves are in proper condition. If the hand periodically or intermittently falls with a quick movement there is probably a leaking exhaust valve. Such movement, of course, is caused by reduction of the vacuum occurring during the intake stroke of the cylinder having the leaking valve, the leaking valve permitting some of the exhaust gases to pass into the cylinder during its intake stroke, thus relieving in part the vacuum whereby the movement of the hand is effected.

If there is a piston with leaking rings, or if a cylinder wall is scored, there will be a more gradual falling of the hand on the gauge than will occur from a leaky exhaust valve, as the vacuum will be relieved by air leaking between the piston and the cylinder wall on the intake stroke, whereby the vacuum is reduced.

In order to verify or check the conclusion of the one making the test as to whether the reduction in vacuum is caused by a leaking valve or piston, a limited quantity of a heavy grade of motor oil may be introduced into the air inlet of the carburetor and the motor slightly speeded up for a few seconds to cause the oil to be drawn into the cylinders. The motor is then throttled down. If the hand does not continue to periodically fall it is safe to assume that there is a leaking piston and that the heavy oil has temporarily sealed the leak. As will be apparent to those skilled in the art, the heavy oil will not substantially seal the leaking exhaust valve.

If desired, as a further check, a few teaspoonfuls of kerosene may be poured into the air inlet of the carburetor and the motor speeded up for a few seconds to cause the kerosene to flush the heavy oil out of the cylinders. The motor is then again throttled down and if the periodic falling of the hand reoccurs, it is safe to assume that a piston is leaking and that the oil had temporarily sealed it.

If a number of exhaust valves are leaking or a number of pistons are leaking it is possible that the hand may remain substantially steady. When the engine is in such condition the vacuum maintained in the intake manifold will be below the designated normal point for the particular make or design of engine and the operator will know that either or both the valves or pistons are leaking. By adding a few teaspoonfuls of a heavy motor oil to the carburetor the operator will be able to ascertain if the trouble is caused by the pistons, the valves, or both. If the vacuum is increased after the oil is added and the hand remains substantially stationary he will know it is piston trouble, and if the hand periodically drops but the vacuum is increased after adding oil he will know it is both valve and piston trouble. Kerosene may be added, if desired, as a check upon the above tests.

While I have in the above description referred to the test as being used primarly to determine the condition of the exhaust valves in an internal combustion engine, it is to be understood that a defective inlet valve on a multi-cylindered engine would cause a like effect on the hand of the gauge as it would permit a portion of the vapors and air during the compression stroke as well as exhaust gases during the firing stroke to escape into the intake manifold whereby the vacuum will be periodically reduced.

From a practical point of view, as those skilled in the art of internal combustion engines will know, the inlet valves will function for a much greater period of time without trouble than will exhaust valves, hence when it is necessary to grind or refit the exhaust valves, the inlet valves are generally ground or refitted while the engine is dismantled for the purpose of grinding the exhaust valves, hence they are generally always in substantially perfect condition unless the valve tappets are improperly adjusted.

The device can be used with efficiency both in the hands of a novice, i. e. the ordinary car owner or user, as well as by experts skilled in the repair and operation of internal combustion engines.

I claim as my invention:

A device for testing an internal combustion engine having an intake manifold, which device comprises a casing having openings in walls thereof, a vacuum gauge within said casing and having a dial mounted adjacent the opening in a side wall of the casing, a valve chamber formed within the casing behind said dial, a connection establishing communication between the valve chamber and gauge, said valve chamber having an opening provided with a valve seat, a nipple communicating with said opening and projecting towards a wall of the casing, a flexible conduit connected to said nipple and adapted to establish communication between the intake manifold of the engine and said valve chamber, a valve stem projecting through the opening in a wall of the casing which is at right angles to said side wall, said valve stem being positioned behind said dial and terminating in a valve adapted to register with said seat and means exterior of the casing for operating said valve stem.

In testimony whereof I affix my signature.

WILLIAM L. HARRIS.